United States Patent [19]

Boyer

[11] 4,022,290
[45] May 10, 1977

[54] OFF-ROAD VEHICLE

[75] Inventor: Jean-Jacques Boyer, Montchauvet, France

[73] Assignee: Societe Anonyme Secmafer, Buchelay, Mantes, France

[22] Filed: June 5, 1975

[21] Appl. No.: 583,907

[30] Foreign Application Priority Data

Aug. 8, 1974 France .............................. 74.27636

[52] U.S. Cl. ............................... 180/14 R; 180/22
[51] Int. Cl.² ......................................... B62D 61/10
[58] Field of Search ................. 180/6.48, 6.2, 9.32, 180/14 R, 22, 44 F, 24.02

[56] References Cited

UNITED STATES PATENTS

| 2,220,890 | 11/1940 | Cook | 180/6.48 |
|---|---|---|---|
| 2,393,324 | 1/1946 | Joy | 180/6.48 |
| 3,161,172 | 12/1964 | Kassbohrer | 180/14 R |
| 3,161,246 | 12/1964 | Meeker et al. | 180/44 F |
| 3,351,037 | 11/1967 | Meili | 180/6.2 X |
| 3,414,072 | 12/1968 | Hodges et al. | 180/14 R |
| 3,417,832 | 12/1968 | Ziccardi | 180/9.32 X |
| 3,520,378 | 7/1970 | Slay | 180/22 X |

Primary Examiner—Joseph F. Peters, Jr.
Assistant Examiner—John A. Pekar
Attorney, Agent, or Firm—Young & Thompson

[57] ABSTRACT

The present invention has for its object an off-road vehicle comprising a central chassis at each end of which is articulated about a transverse axis, a bogie chassis with a jack acting between the central chassis and each bogie chassis to permit regulation of their relative longitudinal inclinations, the transverse axis of articulation of each bogie chassis on the central chassis being located in the neighborhood of the end of the bogie chassis adjacent to the central chassis, the transverse axis of articulation being located above the plane of the axes of bogie wheels and the jack acting between the central chassis and a point of the chassis carrying the wheels located below the transverse axis.

8 Claims, 14 Drawing Figures

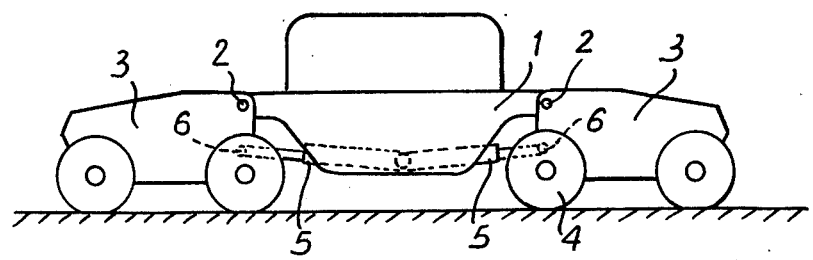
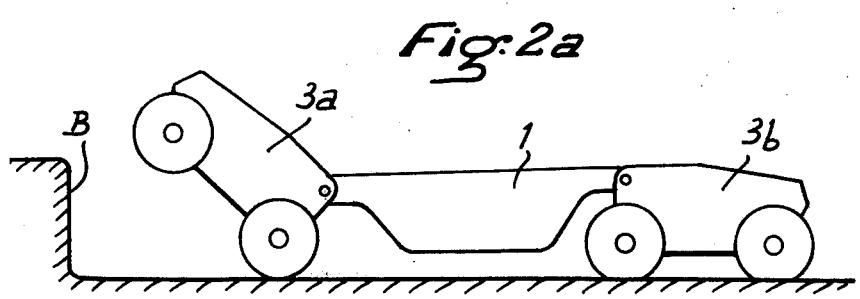
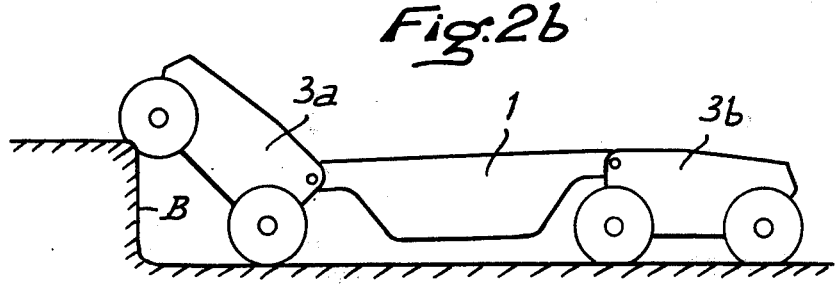
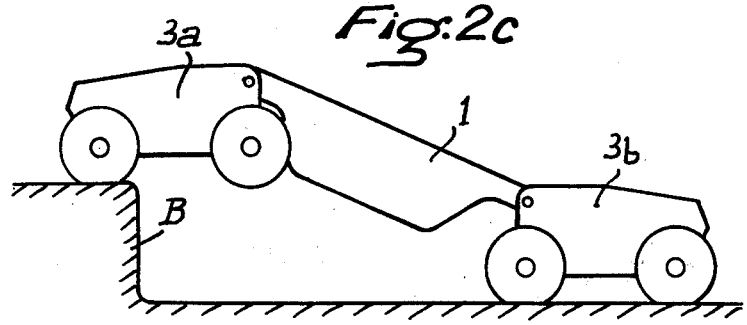

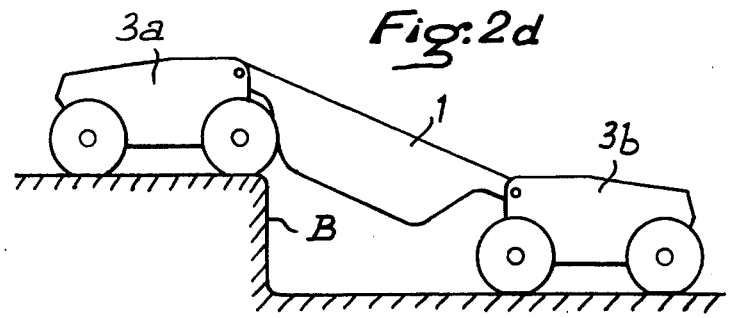
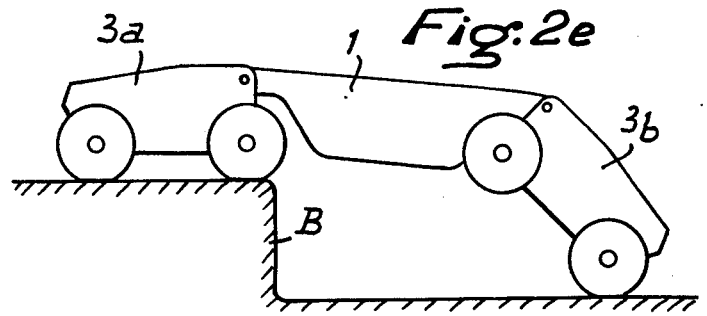
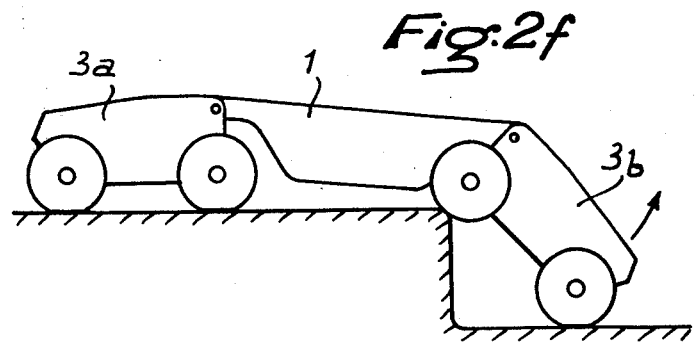
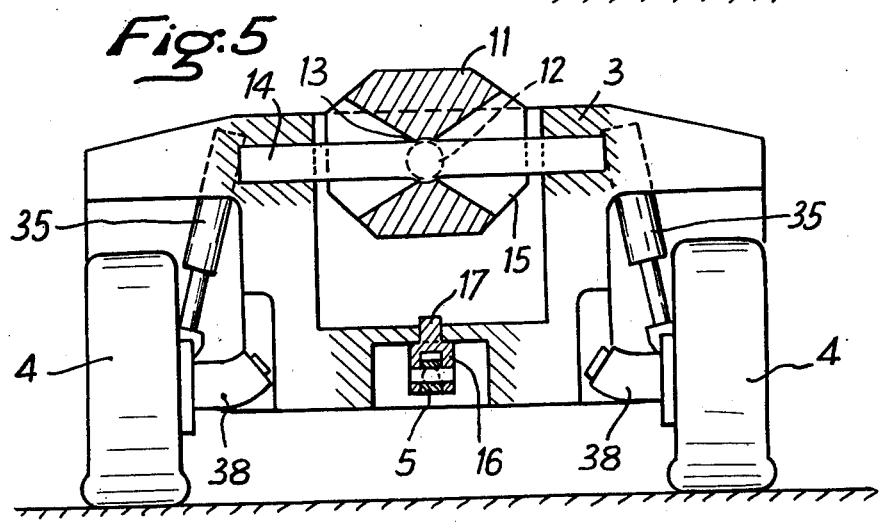

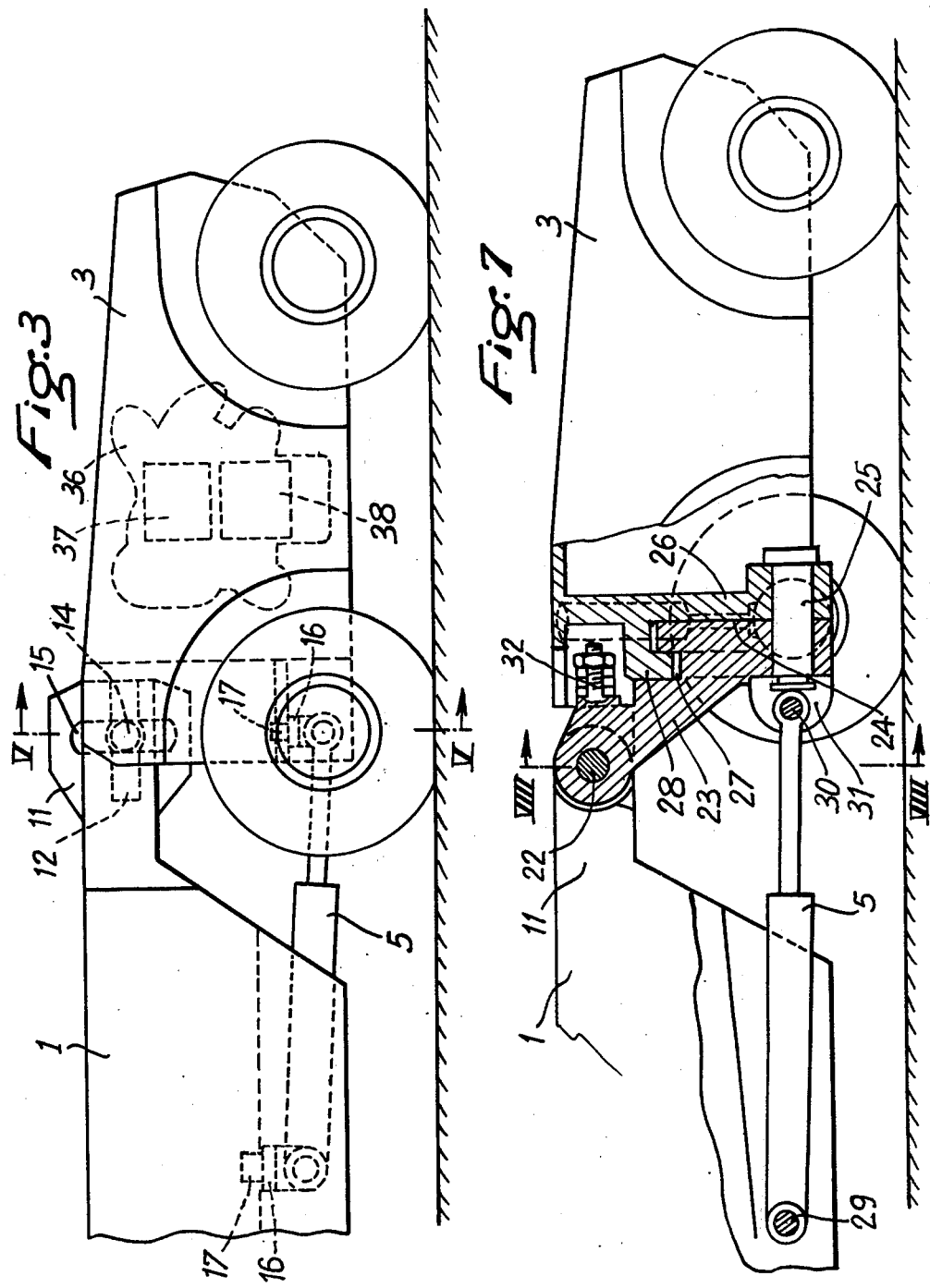

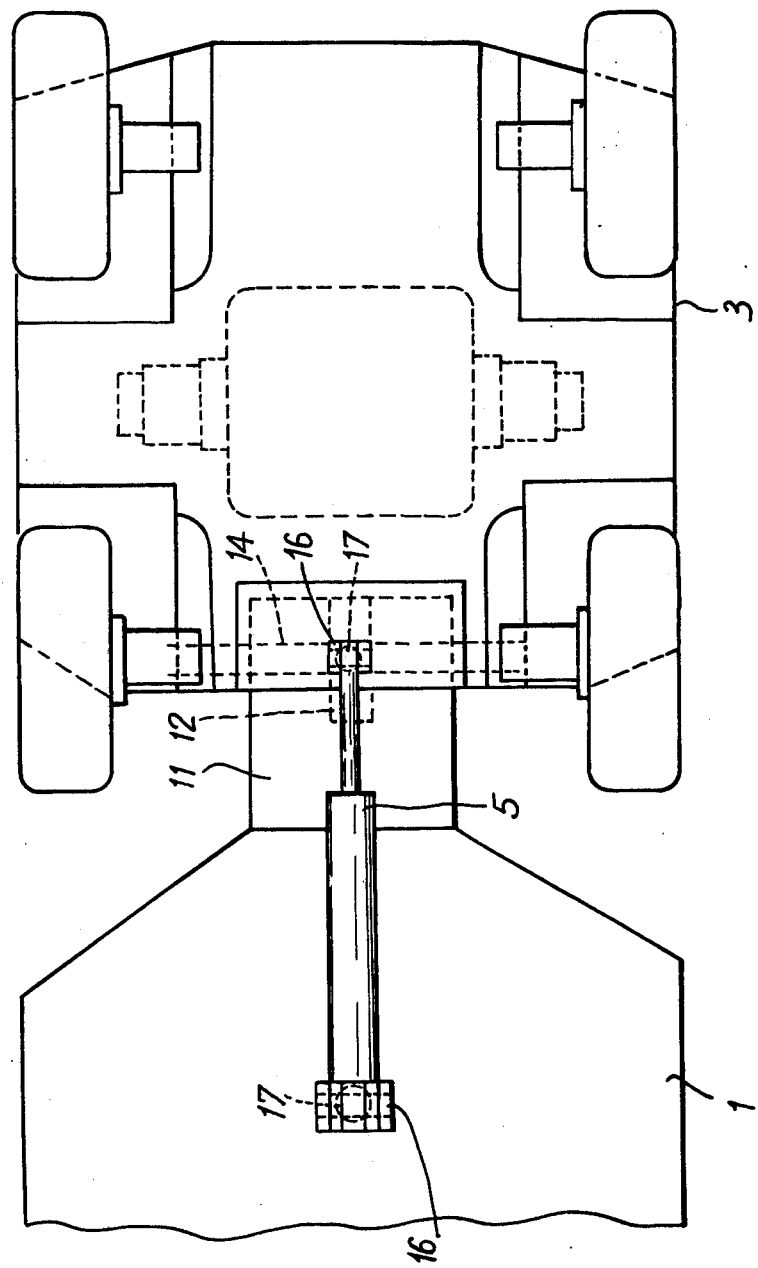

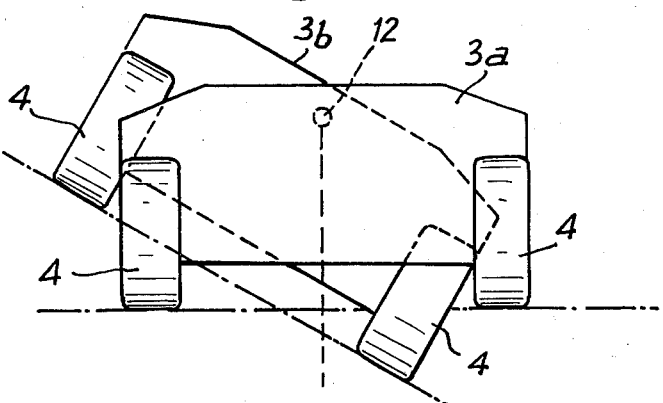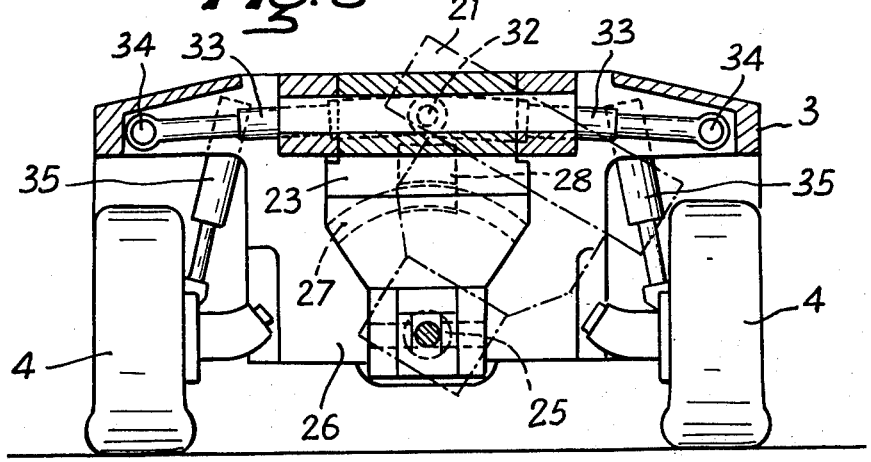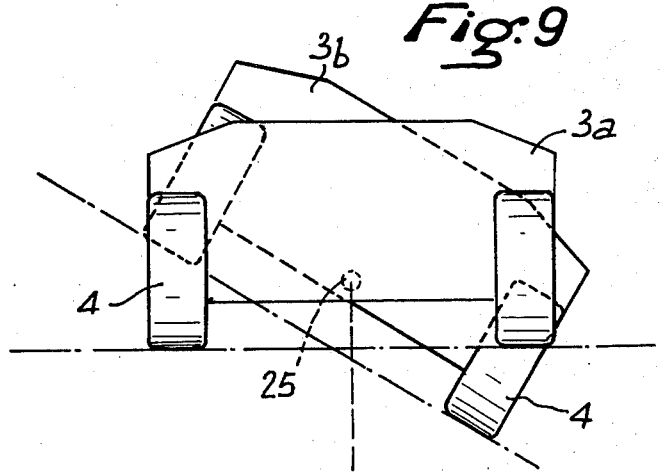

OFF-ROAD VEHICLE

The present invention relates to an off-road vehicle and particularly a vehicle capable of surmounting obstacles of substantial dimensions such as embankments, trenches and the like.

Up to now the said off-road vehicles have been essentially based on a reduction of ground pressure by using endless tracks or large section tyres, by an increase of power and by using the principle of all driven wheels.

These vehicles have the disadvantage of longitudinally rigid chassis, which, whatever the suspension used for the axles or the bogie wheels or the driving rollers of the endless track, limit their capacity for surmounting embankments, slopes, treaches and like irregularities having abrupt changes of gradient. In fact on the change of gradient the supports are limited to the mere end supports, either the sole front and rear wheels or the front and rear extremities of the caterpillar tracks, and the driving force is correspondingly reduced. Moreover the centre of gravity must remain within the support polygon, which prevents the surmounting of accentuated gradients of substantial unevenness for which the centre of gravity of the vehicle cannot be brought beyond the crest before the rear support reaches the change of gradient.

It is an object of the present invention to remedy these disadvantages and to create an off-road vehicle having improved surmounting properties as well as other advantageous characteristics.

The off-road vehicle according to the invention comprises a central chassis at each end of which is articulated about a transverse axis, a bogie chassis with a jack acting between the central chassis and each bogie chassis to permit regulation of their relative longitudinal inclinations, the transverse axis of articulation of each bogie chassis on the central chassis being located in the neighbourhood of the end of the bogie chassis adjacent to the central chassis, the transverse axis of articulation being located above the plane of the axes of bogie wheels and the jack acting between the central chassis and a point of the chassis carrying the wheels located below the transverse axis.

With the manner of construction it is possible, for surmounting an obstacle, to incline the front bogie chassis so as to ensure the supporting of its front part on the ridge of the obstacle and to raise the central chassis by the action of the jack, the rear bogie remaining fully supported in front of the obstacle, then after engagement of the front bogie beyond the ridge, inclining the rear bogie chassis to raise the central chassis and effect crossing of the ridge at the centre of gravity when the rear extremity of the rear bogie is always in support. The reverse manoeuvre is clearly possible for descending an obstacle. Moreover this arrangement permits, for a given width of bogie and a given angle of rotation, a greater variation of level of the extremity of the bogie opposed to articulation.

According to another characteristic of the invention, one at least of the bogie chassis is mounted for rotation about a longitudinal axis. The longitudinal and transverse axes of articulation can be in a same plane for effecting a universal joint assembly, the corresponding jack being articulated through a ball and socket joint or universal joint on the central chassis and on the bogie chassis. The two axes can likwise be carried by an intermediate member articulated on the central chassis about a transverse axis, the jack acting on the intermediate member, the bogie chassis being mounted for rotation about the longitudinal axle carried by the said intermediate member. The inclination of each bogie about the longitudinal axis can be regulated by dash pots acting between the central chassis or the intermediate member and the bogie chassis. The arrangement of the intermediate member permits lowering of the level of the longitudinal axis of articulation and the increasing by this fact of the transverse stability.

According to another characteristic, the bogies are self-propelling. The bogies can be of the type having two endless tracks or of the wheeled type with at least three wheels per bogie. Preferably the driving of each endless track or of each wheel in ensured by an independent hydrostatic transmission with a variable output pump in such a way as to have complete independence of the drives and to be able to apply the whole of the power of the bogie drive to each endless track or to each wheel and to ensure a self-braking effect in the case of slipping of one of the wheels or when this wheel is raised. This arrangement likewise permits branching in parallel two pumps for supplying a single driving wheel, the circuit of the other driving wheel being short-circuited so as to ensure a greater speed for displacements on the road. The hydrostatic transmission with a variable output pump likewise permits obtaining high couples for a low speed of rotation of the drive.

In the case of a suspension by wheels, each wheel is carried by an independant hydropneumatic suspension, permitting regulation of the support pressure of each wheel and its level in relation to the bogie chassis. The wheels can be all driven and the charge of the different pumps can be controlled to ensure for each wheel a speed which is a function of its turning radius. According to another characteristic, the charge of each pump is subject to the pressure of the circuit which it supplies in order to maintain an equal couple on the four wheels independently of their own speed of rotation.

Other features of the invention and the advantages which proceed therefrom appear more clearly from the detailed description below with reference to the accompanying drawings in which:

FIG. 1 is a schematic view in lateral elevation of an off-road vehicle having eight wheels, in accordance with the invention;

FIGS. 2a to 2f are schematic views in lateral elevation of the vehicle according to FIG. 1 in the course of different phases of surmounting a vertical embankment;

FIG. 3 is a detailed view in lateral elevation on a larger scale of part of the off-road vehicle according to a first embodiment;

FIG. 4 is a schematic view from below corresponding to FIG. 3;

FIG. 5 is a sectional view on the line V—V of FIG. 3;

FIG. 6 is a schematic view from the front of the vehicle according to FIG. 3 and 4 illustrating the relative position of the bogies when one of them is on an incline of 30°;

FIG. 7 is a lateral elevational view with partial longitudinal section illustrating a variation of the embodiment;

FIG. 8 is a schematic sectional view along the line VIII—VIII of FIG. 7;

FIG. 9 is a sectional view corresponding to FIG. 6 for the variation of the embodiment of FIGS. 7 and 8.

The off-road vehicle shown schematically in FIG. 1 comprises a central chassis 1 articulated at its two ends at 2, about at least a transverse axis, to the neighbouring end of a bogie chassis 3. Each bogie is carried by two endless tracks or, preferably, four wheels 4, the central chassis 1 being connected to each bogie chassis 3 by a jack 5 articulated to the bogie chassis at 6 below the transverse axis 2.

There is now described a surmounting manoeuvre of an absolutely vertical embankment B, by the above-described vehicle, with reference to FIG. 2a to 2f. In 2a, the vehicle arrives in front of the embankment B. Its front bogie 3a is inclined by extending the front jack 5 to the maximum, then continues to advance until the front wheels 4 of the bogie 3a are supported on the top of the embankment as shown in FIG. 2b. By advancing and by shortening the jack 5 of bogie 3, the central chassis is raised as shown in FIG. 2c, permitting continuation of the advance up to the position of FIG. 2d. At this point, to cause the central chassis to surmount the ridge of the embankment B the jack 5 of chassis 3b (FIG. 2e) is fully shortened, the bogie 3b being supported only on its rear wheels. The vehicle then advances (FIG. 2f) to bring the front wheels of the rear bogie 3b to be supported on the ridge of the embankment, the jack 5 of the rear bogie 3b is then extended causing the latter to be turned in the direction of the arrow F bringing the whole vehicle to the upper level of the embankment. In this method of surmounting, the vehicle always retains at least three axes of support. Surmounting capacities to a slightly greater height can be attained if the nature of the ground and the side of the embankment permit limiting the support to two axes and utilising the support of the wheels on the side of the embankment as thrust component on the vehicle.

In practice, in order to permit the passage with varible inclinations which the hydropneumatic suspensions will not be ready to absorb, each bogie chassis is likewise articulated to the central chassis about a longitudinal axis.

In the first embodiment of FIGS. 3 to 5, the central chassis 1 carries at its two ends a nose 11 in which is axially mounted, whilst being free to rotate, a shaft 12 of a cross bar 13, the other shaft 14 of the cross bar being able to have a wandering movement of a number of degrees about the shaft 12 due to the vertical slots 15 in the nose 11. The extremities of the shaft 14 which extend laterally beyond the nose 11 are mounted for rotation in the chassis 3 of the bogie. The jack 5 is articulated at its two extremities in the frames 16 which are pivoted about the vertical axis 17 to provide for the rotational movement of the bogie chassis about the shaft 12.

In this embodiment and as illustrated in FIG. 6 when one of the bogies 3b runs on an incline, for example at 30° as illustrated, then the bogie 3a runs on a horizontal course; the tracks are much displaced and the load is unequally spread on the wheels, the downhill wheels being very overloaded.

The embodiment of FIGS. 7 and 8 has as its object the remedying of this disadvantage by utilising an intermediate member. The nose 21 of the central chassis is fork-shaped, the two arms of the fork carrying a shaft 22 transverse to the longitudinal axis of the machine. On this shaft 22 is mounted for rotation an intermediate member 23 which has a cheek 24 parallel to the shaft 22. Below this cheek and substantially on the level of the axes of the wheels 4 there is mounted a shaft 25 located in the axial longitudinal plane of the central chassis. A cheek 26 of the bogie chassis 3 is mounted for rotation on this shaft 25. The cheek 24 comprises on the other hand, a groove 27 of circular section in which a lug 28 integral with the cheek 26 engages.

The jack 5 is articulated at one extremity on an axle 29 carried by the central chassis 1 and, at its other extremity on an axle 30 carried by the cheeks 31 located on the member 23 on both sides of the axis 25. The jack 5 thus drives the rocking of the member 21 and of the bogie chassis 3 about the axis of shaft 22.

On the member 23 and about one end of the longitudinal axis 32 there are articulated two dash pots 33, the other extremity of which is articulated at 34 on the chassis 3 of the bogie. These dash pots permit regulation of the relative transverse inclination of the bogie and the central chassis, the member 23 being represented by dot-dash lines in FIG. 8 at one of its maximum inclinations.

As shown in FIG. 9 this embodiment permits substantial retention of the same track for the wheels of the two bogies 3a and 3b and balances the load on the downhill and uphill wheels of an inclined bogie.

The jacks 5 above described are preferably of the hydropneumatic type and play the role of dash-pots and distributors of the load between the two axles of the same bogie.

In the two embodiments, the wheels 4 are suspended in independent fashion by the hydropneumatic jacks 35. The driving of the wheels in ensured by a drive 36 housed in each bogie, a drive which ensures the driving of four hydraulic pumps, these pumps having a variable output and each of them feeding at low speed a hydraulic motor 38. As indicated above the two pumps on a same side can be connected in parallel to a single motor 38 for high speed and the output of the pumps can be controlled in direction to ensure a greater speed of the exterior wheels in turning. Alternatively or simultaneously, the output of the pumps can be subjected to the pressure of its own distribution system in order to have identical couples on all the wheels, this couple being regulated by a general control, since these controls do not form a part of the present invention they are not described in more detail.

The embodiments above described by way of example can be modified in a number of ways without departing from the framework of the present invention, these embracing for example the case where a larger number of driving or free wheels or driving or free endless tracks are mounted under the bogies and/or the central chassis to permit for example the vehicle, in case elements of one or both bogies are put out of service, to follow its route or to assist the bogies to surmount difficult passages such as trenches of great width. Likewise within the framework of the invention is the supplying of the motors 36 of the bogies enclosed in the airtight casings with air intakes mounted at high points of the central chassis so as to permit the crossing of fords, the central chassis 1 being raised by retraction of the jacks 5, the vehicle running only on its end axles.

What is claimed is:

1. An off-road vehicle comprising a central chassis at each end of which is articulated, about a transverse axis, a bogie chassis with a jack acting between the central chassis and each bogie chassis to permit regulation of their relative longitudinal inclinations, each bogie chassis having supports thereon mounted for rotation about horizontal axes disposed at the front and rear of it for supporting the bogie chassis on the ground, the transverse axis of articulation of each bogie chassis on the central chassis being located at the end of the bogie chassis adjacent to the central chassis and being located above the plane of said axes, said jacks acting between the central chassis and a point on the bogie chassis which is located below the transverse axis of articulation of the associated said bogie chassis.

2. An off-road vehicle according to claim 1, in which one at least of the bogie chassis is mounted for rotation about a longitudinal axis.

3. An off-road vehicle according to claim 2, in which the longitudinal and transverse axes of articulation are in a same plane, the corresponding jack being articulated by a ball-and-socket or a universal joint on the central chassis and on the bogie chassis.

4. An off-road vehicle according to claim 2, in which the longitudinal and transverse axes of articulation are provided by an intermediate member articulated on the central chassis about a transverse axis, and on which the jack acts, the bogie chassis being mounted for rotation about a longitudinal axle carried by said intermediate member.

5. An off-road vehicle according to claim 4, in which the inclination of each bogie about the longitudinal axis is controlled by dash pots acting between said intermediate member and the bogie chassis.

6. An off-road vehicle according to claim 1, and means on said bogies for rotating said supports.

7. An off-road vehicle according to claim 1, in which said supports comprise wheels.

8. An off-road vehicle according to claim 1, in which said supports comprise endless treads.

* * * * *